O. ADAMS.

Valve for Steam-Engine.

No. 8,036. Reissued Jan. 8, 1878.

WITNESSES

Alexander Mahon

John G. Center

INVENTOR

Otis Adams by A. M. Smith

ATTORNEY

UNITED STATES PATENT OFFICE.

OTIS ADAMS, OF SAN FRANCISCO, CALIFORNIA.

IMPROVEMENT IN VALVES FOR STEAM-ENGINES.

Specification forming part of Letters Patent No. 130,099, dated August 6, 1872; Reissue No. 8,036, dated January 8, 1878; application filed December 29, 1877.

*To all whom it may concern:*

Be it known that I, OTIS ADAMS, of the city and county of San Francisco, State of California, have invented an Improved Arrangement of Valves for Steam Engines or Pumps, of which the following is a specification:

The invention relates to a novel arrangement of valves, and of the steam-passages between said valves and the working-cylinder, for adapting the steam from said cylinder to automatically operate the valves for supplying the steam to and releasing it from the cylinder.

The broad idea or principle of operating valves by steam from the cylinder, I am aware, is not new, the same having been shown in the patent granted to N. W. Wheeler, July 31, 1855, No. 13,369; but the particular arrangement of valves and steam-passages hereinafter described, by which the result specified is attained, is believed to be new, and to constitute an improvement in this method or plan of operating or controlling the valves.

Figure 1:
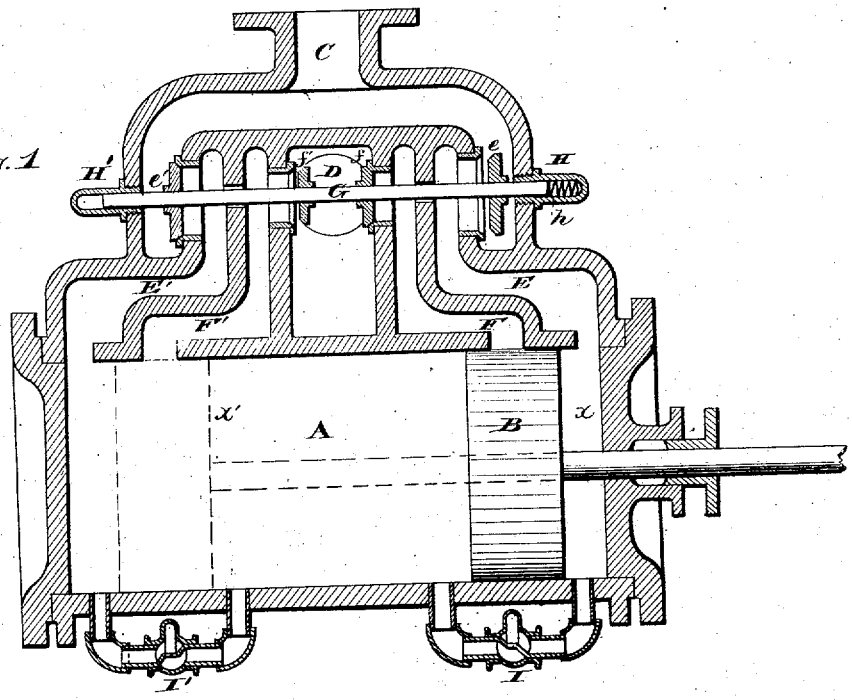
Figure 2:
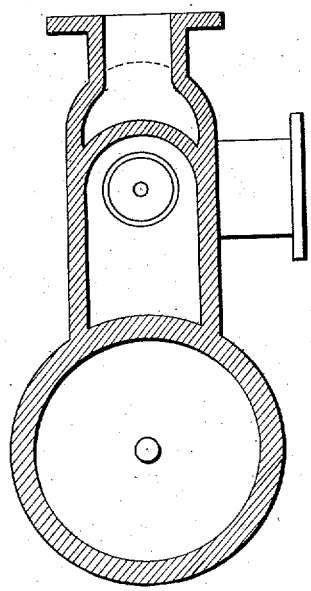

In the accompanying drawing, Figure 1 is a longitudinal section of a steam-cylinder and steam-chest, showing supply and exhaust valves. Fig. 2 is a cross-section of the same.

In Fig. 1, A is the working-cylinder. B is the piston. C is the supply-nozzle. D is the exhaust-nozzle. E E′ are the induction-passages; *e e′*, the induction-valves. F F′ are the eduction-passages; *f f′*, the eduction-valves. These valves *e e′* and *f f′* are arranged all in the same line, and are shown connected with the stem G in such manner as to move together therewith.

H H′ are the guides which support the valve-stem. A spiral spring, *h*, may be inserted in one of these guides when the cylinder sits horizontally. This spring will serve to throw the valves whenever the regular action of the steam might fail to do so.

I I′ are pipes or passages, shown provided each with a check-valve, said pipes or passages serving to permit the steam to pass from behind in front of the advancing piston as the latter reaches certain points in its throw, for a purpose hereinafter described.

It will be seen that the valves *e e′* are of greater diameter and area than the valves *f f′*. Let it be assumed the valves *f f′* are four inches area and the valves *e e′* six inches area; then the operation is as follows; The valves being in position as shown in Fig. 1, the valves *e* and *f′* have just been thrown open, because the steam in the cylinder has acted with a pressure of, say, seventy pounds per square inch on the combined areas of these valves, equal to ten inches at seventy pounds per inch, or seven hundred pounds total pressure, while the only resistance overcome was that due to the pressure of, say, one hundred pounds per square inch on the six inches of area of the valve *e*, which gave only six hundred pounds of resistance. The difference between the pressure and the resistance in this case—one hundred pounds—served to throw open the valves, as shown. The cylinder is now receiving steam through the passage E and exhausting through the passage F′. The check-valve at I will not permit the steam to pass from *x* to *x′*; but when the piston arrives at where the dotted lines indicate, then the exhaust-passage F′ will be closed, and all pressure be removed from the valve *f′*, while the passage I′ will be open, and the steam in *x* will pass to *x′*, to operate on the valves *e′* and *f*, as before on the valves *e* and *f′*. Thus an alternating opening and closing of the valves is obtained, for the purpose of supplying and exhausting the steam as the piston arrives at the points indicated in the drawing.

To this engine steam or water may be applied as the motive power.

Having now described the invention, what I claim as new, and desire to secure by Letters Patent, is—

1. In an engine, the operating-valves, arranged in line and moving together, in combination with separate steam and exhaust passages, adapting said valves to be operated automatically by pressure from the working-cylinder.

2. The arrangement and combination of four valves on the stem G, in connection with passages E E′, F F′, and I I′, substantially as and for the purpose described.

OTIS ADAMS.

Witnesses:

WILLIAM HARNEY,
HARRY R. COUSINS.